UNITED STATES PATENT OFFICE.

WILLIAM N. BAKER, OF GENESEO, NEW YORK.

COMPOSITION FOR PLASTERS.

SPECIFICATION forming part of Letters Patent No. 316,932, dated May 5, 1885.

Application filed January 24, 1885. (No specimens.)

*To all whom it may concern:*

Be it known that I, WILLIAM N. BAKER, a citizen of the United States, residing at Geneseo, in the county of Livingston and State of New York, have invented a new and useful composition of matter to be used for the cure or alleviation, by external application in the form of a plaster, of all bodily disorders or injuries to persons in the nature of muscular weakness, strains, bruises, fresh wounds, inflammation, rheumatic, neuralgic, and all chronic pains, ulcerations, and ailments of every kind which may be treated by the application of a healing-plaster, of which the following is a specification.

My composition consists of the following ingredients, combined in the proportions stated, viz:

First. Pure water, nine gallons; burdock (*Lappa*) leaves, dried, three pounds; mullein (*Verbascum thapsus*) leaves, dried, one pound; chamomile (*Anthemis*) blossoms, dried, one pound; catnip (*Nepeta cataria*) leaves, dried, three pounds; horse-radish (*Armoraciæ radix*) leaves, dried, one pound; smart-weed (*Water-pepper*) plant, dried, three pounds; cat-tail-flag (*Calamus*) root, dried, one-half pound. Said ingredients are placed in a suitable vessel and boiled until the full strength of the herbs is extracted. The liquor is then strained off, and is subsequently boiled down to about one-third of the original quantity of water included therein, when it is allowed to cool and is re-strained, and may be stored away for use as required in the succeeding process as follows:

Second. In the second process in the manufacture of my composition eight pounds of rosin (*Resina*) and one pound of beef-tallow are placed together in a vessel and melted over a slow fire, to which ingredients is added one pint of the extract from the herbs in the first process, as hereinbefore described. Dried spikenard (*Nard*) root and dried comfrey (*Symphytum*) root two ounces of each are placed in separate vessels, containing each one pint of water, and are severally boiled until the liquid is reduced to one-fourth of a pint in each vessel, when it is strained off into the vessel containing the rosin, tallow, and extract of herbs, as above set forth. The contents of said last-named vessel are then boiled over a slow fire for about two hours' time, and during such boiling continuously agitated by stirring. When thoroughly cooked, one ounce of hemlock-oil (*Conium*) and one ounce of camphor-gum (*Camphora*) are added to the composition, which is allowed to boil a sufficient time afterward for completely dissolving and mingling said last-named ingredients therewith. The preparation is then cooled sufficiently for manipulation by hand, and is worked into convenient bars or rolls or such other attractive form for package and sale as may be desirable.

In using the above composition it is softened by the application of heat and is spread upon a strip of thin and fine-grain leather, or upon other appropriate material, and is applied to the parts affected as a plaster.

My invention is an efficacious remedy in the treatment of the injuries and disorders hereinbefore mentioned, and for all possible bodily affections which are capable of being treated by the application of a medicinal plaster.

I am not aware that all of the ingredients of my composition, in the proportions stated and prepared in accordance with the formula herein given, have ever been used together.

What I claim, and desire to secure by Letters Patent of the United States, is—

The said composition of matter, consisting of pure water, burdock-leaves, mullein-leaves, chamomile-blossoms, catnip-leaves, horse-radish leaves, smart-weed plant, cat-tail-flag root, rosin, beef-tallow, spikenard-root, comfrey-root, hemlock-oil, and camphor-gum, in the proportions specified.

Dated January 15, 1885.

WILLIAM N. BAKER.

Witnesses:
 JAMES S. THOMPSON,
 W. T. HOWARD.